(12) United States Patent
Yamamoto et al.

(10) Patent No.: US 7,876,053 B2
(45) Date of Patent: Jan. 25, 2011

(54) NITRIDE SINTERED BODY AND METHOD FOR MANUFACTURING THEREOF

(75) Inventors: Yasuyuki Yamamoto, Yamaguchi (JP); Yukihiro Kanechika, Yamaguchi (JP); Masakatsu Maeda, Yamaguchi (JP)

(73) Assignee: Tokuyama Corporation, Yamaguchi (JP)

( * ) Notice: Subject to any disclaimer, the term of this patent is extended or adjusted under 35 U.S.C. 154(b) by 509 days.

(21) Appl. No.: 11/630,630

(22) PCT Filed: Jun. 20, 2005

(86) PCT No.: PCT/JP2005/011281

§ 371 (c)(1),
(2), (4) Date: Dec. 21, 2006

(87) PCT Pub. No.: WO2005/123627

PCT Pub. Date: Dec. 29, 2005

(65) Prior Publication Data

US 2008/0284309 A1    Nov. 20, 2008

(30) Foreign Application Priority Data

Jun. 21, 2004  (JP) .............................. 2004-182354
Dec. 15, 2004  (JP) .............................. 2004-363004

(51) Int. Cl.
*H01J 17/16*  (2006.01)

(52) U.S. Cl. ..................... 313/636; 501/153; 264/674

(58) Field of Classification Search .................. 313/634, 313/636

See application file for complete search history.

(56) References Cited

U.S. PATENT DOCUMENTS

| 5,529,852 | A  | * | 6/1996  | Sasame et al. ............... 428/620 |
| 5,677,052 | A  | * | 10/1997 | Shimoda et al. .............. 428/336 |
| 5,767,027 | A  | * | 6/1998  | Sakon et al. ................ 501/98.4 |
| 5,955,148 | A  | * | 9/1999  | Shimoda et al. ........... 427/376.1 |
| 7,503,825 | B2 | * | 3/2009  | Wei ............................... 445/26 |
| 7,737,461 | B2 | * | 6/2010  | Maeda et al. .................. 257/99 |
| 2004/0126598 | A1 | * | 7/2004  | Tanaka et al. ............... 428/469 |
| 2005/0258759 | A1 | * | 11/2005 | Wei .............................. 313/634 |
| 2006/0183625 | A1 | * | 8/2006  | Miyahara .................... 501/98.4 |
| 2007/0272938 | A1 | * | 11/2007 | Maeda et al. .................. 257/99 |

(Continued)

FOREIGN PATENT DOCUMENTS

JP        63-277570        11/1988

(Continued)

*Primary Examiner*—Peter Macchiarolo
(74) *Attorney, Agent, or Firm*—Ladas & Parry LLP

(57) ABSTRACT

An insulating material high both in thermal conductivity and light reflectance, and a submount high in heat radiatability for mounting an LED element thereon, capable of raising a light utilization factor and quickly radiating heat generated from the element. For example, used as a substrate material of a submount is a nitride sintered body having a reflectance of light in the wavelength region of from 350 nm to 800 nm of 50% or more and a reflectance of light with a wavelength of 700 nm of 60% or more, obtained by sintering a preform consisting of a composition containing 100 parts by mass of aluminum nitride powder and 0.5 to 10 parts by mass of a compound containing an alkaline earth metal such as 3CaO× Al2O3 in an inert atmosphere containing a specific quantity of carbon vapor, or by burning a coat of a nitride paste applied on a base substrate having a heat resistance at a predetermined temperature.

7 Claims, 9 Drawing Sheets

U.S. PATENT DOCUMENTS

2008/0277841 A1 * 11/2008 Natsuhara et al. ........... 264/603

FOREIGN PATENT DOCUMENTS

| | | |
|---|---|---|
| JP | 1-230481 | 9/1989 |
| JP | 4-50172 | 2/1992 |
| JP | 4-65367 | 3/1992 |
| JP | 6-116039 | 4/1994 |
| JP | 8-109069 | 4/1996 |
| JP | 11-92229 | 4/1999 |
| JP | 2003-40675 | 2/2003 |
| JP | 2003-048780 | 2/2003 |
| JP | 2003-60243 | 2/2003 |
| JP | 2003186175 A * | 7/2003 |
| JP | 2004-152952 | 5/2004 |
| JP | 2004152952 A * | 5/2004 |
| JP | 2004-172577 | 6/2004 |
| JP | 2005191065 A * | 7/2005 |
| WO | WO 95/21139 | 8/1995 |
| WO | 2005/123627 A1 | 12/2005 |

* cited by examiner

NITRIDE SINTERED BODY AND METHOD FOR MANUFACTURING THEREOF

BACKGROUND OF THE INVENTION

1. Field of the Invention

The invention relates to a nitride sintered body having a high thermal conductivity and a high reflectance in the visible light region and a method for manufacturing thereof.

2. Description of the Background Art

Monochromatic light emitting diodes (a light emitting diode is hereinafter referred to as LED) emitting light in colors such as red, green and blue, and a white LED have been introduced commercially, which has increased applications of light emitting elements using LED to a large extent.

For example, an LED emitting blue light using a GaN based compound semiconductor is fabricated and put into practice in a way such that an insulating sapphire is generally adopted as a substrate, p side and n side electrodes are formed on the front surface side of a compound semiconductor stacked on the substrate, which is used as a so-called flip chip type light emitting element surface-mounted on the electrode face thereof. Since sapphire of the substrate is light transmissive in such a flip chip type light emitting element, the sapphire substrate is mounted on a substrate, being directed to a light emitting direction side and the surface of the sapphire substrate can be used as a main light take-out surface. Recently, a light emitting element chip has been mounted on a substrate of equipment, and as a useful light emission source, a compound light emitting element has been employed that is obtained by mounting the light emitting element chip, for example, on a submount element used for electrostatic protection with a Zener diode.

Such a compound light emitting element has a structure that a flip chip type of blue light emitting element is conduction-mounted on a submount, which is conduction-mounted on a mounting substrate incorporated in electronic equipment or the like. Conventionally, a silicon substrate has been used as a submount, while there has been a problem that a compound light emitting element is reduced in luminance thereof since the silicon substrate absorbs light in the wavelength range of from 450 nm (blue) to 560 nm (green) emitted from an LED.

A proposal has been offered in Japanese Patent Application Laid-Open (JP-A) No. 2003-60243 of a structure, as a compound light emitting element without such a problem, that a mounting surface of a light emitting element is made of a white insulating material such as alumina. In recent years, however, a problem has occurred that a generated heat quantity from an LED increases in company with progress toward high luminance, thereby raising an element temperature. When an element temperature rises to exceed an allowable value, a light emission wavelength is shifted to the longer wavelength side, a chroma saturation decreases because of a broader half value width of a wavelength distribution, and luminance is reduced, thereby lowering characteristics of the element. A necessity arises for heat to be radiated by a heat radiating member through a submount in order to prevent a temperature of such an element from rising, whereas an alumina substrate that has been conventionally employed as a submount material in JP-A 2003-60243 has a problem that a thermal conductivity thereof is as low as about 20 W/m·K, thereby disabling effective heat radiation to be achieved.

Though such a problem is thought to be able to be solved by constituting a submount with an insulating material high both in thermal conductivity and light reflectance, no insulating material meeting such a requirement has been found. For example, an $SiO_2$—$Al_2O_3$—$MgO$—$ZeO_2$—$Cao$ based ceramic with a specific composition has been known as a white ceramic other than alumina (see JP-A No. 2004-152952). Since the ceramic includes $Al_2O_3$ as a main component (96.25 wt %), however, a thermal conductivity thereof is as low as expected.

Although a boron nitride sintered body has been known as expressing a white color, the thermal conductivity of the boron nitride sintered body commercially available is about 20 W/m·K, of which range is same as that of alumina. On the other hand, nitride sintered bodies including aluminum nitride sintered body or silicon nitride sintered body have been known as an insulating material high in thermal conductivity, whereas a nitride sintered body that has been conventionally known has a problem in the aspect of a light reflectance. For example, an aluminum nitride sintered body is of a tone of light transmissive gray color (refer to the comparative example 6 of present application) and a silicon nitride sintered body has a gray or a black color.

Note that in JP-A No. 2004-152952, it is described that a content of $Er_2O_3$ is preferably in the range of 1 to 10 wt % relative to a total weight of aluminum nitride sintered body for getting a reflectance of light with a wavelength in the range of 400 to 700 nm is 80% or more. There is no disclosure of examples corresponding to the description, however, and it has been confirmed that even sintering of a composition for an aluminum nitride sintered body having a content of $Er_2O_3$ in the range of 1 to 10 wt % relative to a total weight thereof cannot produces a white sintered body (see the comparative example 5 of the present application).

SUMMARY OF THE INVENTION

It is an object of the invention to provide a novel insulating material high both in thermal conductivity and light reflectance and a method for manufacturing thereof, and a submount and a compound light emitting element without the problem as described above.

The present inventors thought that the problem can be solved by whitening a nitride sintered body and has been conducted serious studies. As a result, in the case of manufacturing the aluminum nitride sintered body, they have found that a nitride sintered body high in thermal conductivity, and having a white appearance can be obtained by using a specific sintering assistant and controlling an atmosphere during burning; or by coating a nitride paste on a base substrate having a heat resistance and burning the coat on the base substrate in a condition that causes voids to remain in the sintered body, which has led to completion of the invention.

That is, a first aspect of the present invention is directed to a nitride sintered body having a thermal conductivity of 50 (W/m·K) or more, a reflectance of light in the wavelength region of from 350 nm to 800 nm of 50% or more, and a reflectance of light with a wavelength of 700 nm of 60% or more.

As described above, a nitride sintered body having a high thermal conductivity generally has a gray color or a black color. Contrast thereto, a nitride sintered body of the invention is characterized by having a white color and having high light reflectance. In addition, as an intrinsic property of nitride, the nitride sintered body has a thermal conductivity much higher than alumina which has been known as a white color insulating material.

It is preferable that the nitride sintered body according to the first aspect of the present invention consists of an aluminum nitride sintered body having a thermal conductivity of 140 (W/m·K) or more, and a density of 3.10 g/cm³ or more.

By adopting such a construction, the nitride sintered body can be characterized by that a thermal conductivity and a density are equal to those of a conventional aluminum nitride sintered body despite a white color and a high light reflectance.

It is preferable that the nitride sintered body according to the first aspect of the present invention has voids with a diameter of 0.1 μm or more at grain boundaries.

Further, it is also preferable that the nitride sintered body according to the first invention has a reflectance of a light in the wavelength region of from 350 nm to 800 nm of 70% or more, a reflectance of a light with a wavelength of 700 nm of 75% or more.

With such a reflectance, a luminance of a compound light emitting element using the aluminum nitride sintered body of the invention can be further raised.

A second aspect of the present invention is directed to a method for manufacturing a nitride sintered body according to the second claim, characterized by including the steps of: preparing a preform by forming a composition containing 100 parts by mass of aluminum nitride powder and 0.5 to 10 parts by mass of a compound containing an alkaline earth metal; sintering the preform prepared in the previous step in a specific weak reducing atmosphere defined below.

A specific weak reducing atmosphere means an atmosphere in a vessel which has a dismountable cover, at least the inner wall of which is made of boron nitride, which has a means for keeping a pressure inside the vessel in a state where the cover is closed substantially equal to a pressure outside the vessel, inside which a carbon plate having a surface area in the range of from 0.024 to 24 mm$^2$ per a volume of 1 cm$^3$ of the vessel is housed and an atmosphere inside which is replaced with an inert gas and/or hydrogen gas, the vessel with the cover closed and, the vessel and the carbon plate in the vessel being heated at a temperature in the range of from 1650° C. to 1950° C. using the same atmosphere outside the vessel as that inside the vessel as the inert gas and/or hydrogen atmosphere.

A third aspect of the present invention is directed to a method for manufacturing a nitride sintered body according to any one of first, third and fourth claims characterized by including the steps of: coating a nitride paste on a base substrate having heat resistance; and burning the base substrate on which the nitride paste is coated in an atmosphere containing a reducing gas, wherein the burning is conducted in a condition that voids having a diameter of 0.1 μm or more remain in the obtained sintered body.

The term "heat resistance" of "having heat resistance" means heat resistance with which a nitride paste layer coated on the base substrate can be held in the burning step. An example of base substrate having such a heat resistance is a nitride ceramics substrate of the same kind as a nitride contained in the paste Further, a fourth aspect of the present invention is directed to a submount for mounting a light emitting element consisting of a placing surface for placing a light emitting element having electrodes; and an insulating substrate having electrodes connected electrically to the electrodes of the light emitting element on a surface thereof, wherein the insulating substrate is made from a nitride sintered body of the first aspect of the present invention, and a fifth aspect of the present invention is a compound light emitting element obtained by adhering a light emitting element onto the submount.

High luminance can be realized in a compound light emitting element of the invention using the sintered body since a nitride sintered body of the invention has a high light reflectance and therefore, light propagating toward a submount element from a light emitting element is effectively reflected toward a main light take-out surface side. The nitride sintered body of the invention can be preferably used as a submount for a white LED since a reflectance, especially, of light with a wavelength of 700 nm is high. As the thermal conductivity of a nitride sintered body of the invention is 50 (W/m·K) or more, the compound light emitting body using the nitride sintered body has a high dissipation of heat generated by LED, resulting in high durability and reliability. A nitride sintered body of the invention has the following two aspects: 1) the nitride sintered body consists of an aluminum nitride sintered body that sintering thereof has sufficiently advanced with a high density, a very high thermal conductivity and very high mechanical strength thereof and 2) the nitride sintered body has a very high light reflectance though a densification level of sintering is not high. Therefore, a compound light emitting element of the invention using an aluminum nitride sintered body in 1) is characterized by that radiatablity of heat generated in an LED, durability and reliability are especially high. In addition, a compound light emitting element of the invention using a nitride sintered body in 2) is characterized by that an effect of progress toward high luminance is especially excellent.

DESCRIPTION OF THE PREFERRED EMBODIMENTS

Figure 1:
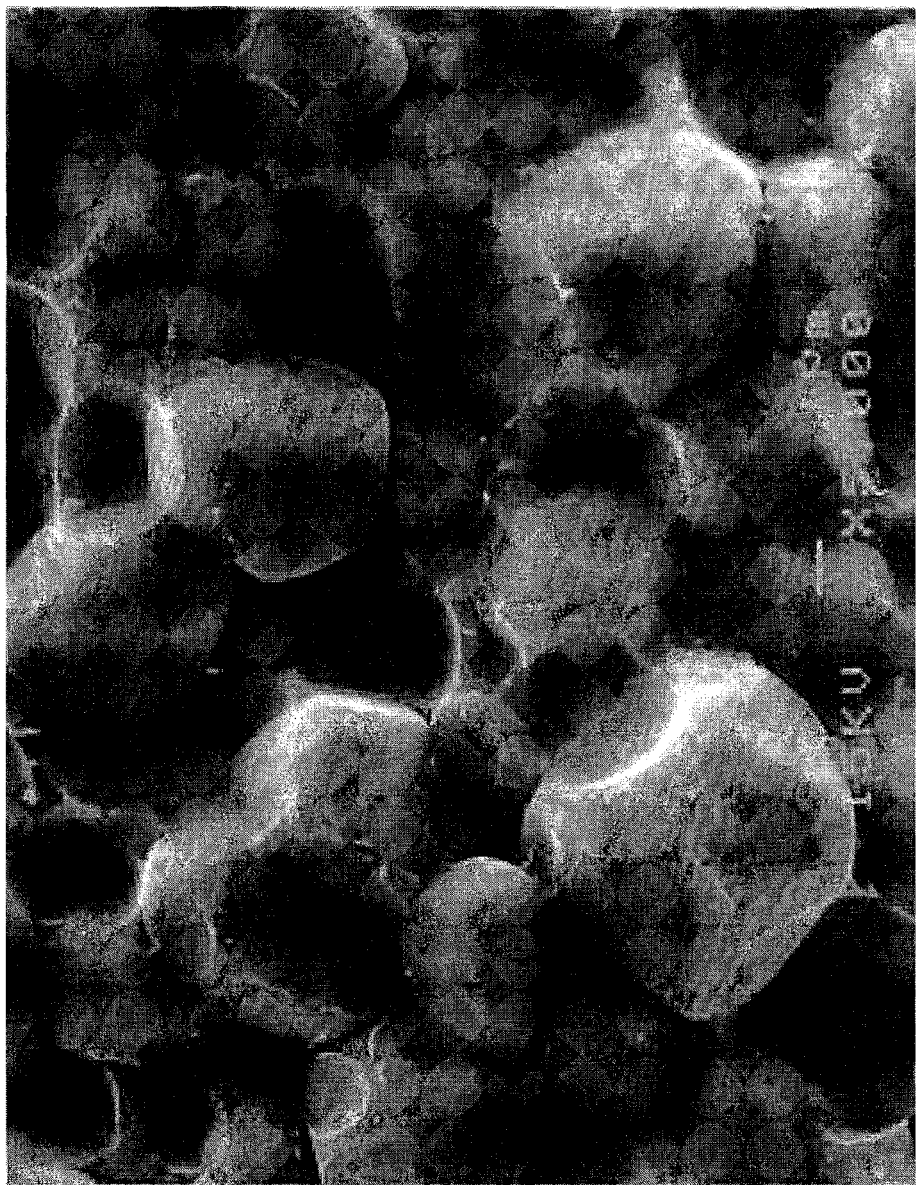
FIG. 1 is a scanning electron microscope (SEM) photograph showing a section of an aluminum nitride sintered body 15 (Example 1) according to a first embodiment.

A nitride sintered body of the invention is characterized by having a thermal conductivity of 50 (W/m·K) or more, a reflectance of light in the wavelength region of from 350 nm to 800 nm of 50% or more and a reflectance of light with a wavelength of 700 nm of 60% or more.

A nitride sintered body according to a first embodiment of the invention has a thermal conductivity of 140 (W/m·K) or more and has a density of 3.10 g/cm$^3$ or more.

A nitride sintered body according to a second embodiment of the invention consists of a nitride sintered body having voids with a diameter of 0.1 μm or more at the grain boundaries. The nitride sintered body has a reflectance of light in the wavelength region of from 350 nm to 800 nm of 70% or more, and a reflectance of light with a wavelength of 700 nm of 75% or more.

With such characteristics, a light take-out efficiency can be raised and a heat dissipation can be enhanced when the nitride sintered body is used, for example, as a submount of a compound light emitting element. A nitride sintered body satisfying all of such physical properties has not been known conventionally and a nitride sintered body of the present invention can be obtained only by adopting a manufacturing method of the invention described later. From the viewpoint of an effect when being used as the submount, it is preferable that a nitride sintered body of the invention has a reflectance of light in the wavelength region of from 350 nm to 800 nm of 65% or more and a reflectance of light with a wavelength of 700 nm of 75% or more.

From the viewpoint of heat dissipation in a construction of a submount of a compound light emitting element, preferable is an aluminum nitride sintered body according to the first embodiment having a thermal conductivity of 144 (W/m·K) or more and a density of 3.10 g/cm$^3$ or more. Note that a theoretical density of an aluminum nitride is 3.26 g/cm$^3$ and the density of 3.10 g/cm$^3$ corresponds to about 95% of the theoretical density.

In the case of a construction as a submount of a compound light emitting element, from the viewpoint of enhancing the luminance of the light emitting element, preferable is an aluminum nitride sintered body of the second embodiment consisting of a nitride sintered body having voids with a diameter of 0.1 μm or more at grain boundaries, and a reflectance of light in the wavelength region of from 350 nm to 800 nm of 70% or more, and a reflectance of light with a wavelength of 700 nm of 75% or more. If voids with a diameter of 0.1 μm or more are not present in the sintered body, a light reflectance decreases. From the viewpoint of a light reflectance, there are present preferably voids with a diameter of 0.5 μm or more and especially preferably voids with a diameter of 1 μm or more. From the viewpoint of a strength and a thermal conductivity, a percent (a porosity) of a volume of voids in a sintered body relative to the total volume of a sintered body is preferably in the range of 1 to 80%, especially preferably in the range of from 10 to 70% and most preferably in the range of from 20 to 60%. In addition, it is especially preferable that a reflectance of light in the wavelength region of from 350 nm to 800 nm is 75% or more and a reflectance of light with a wavelength of 700 nm is 80% or more.

A nitride sintered body in the present invention means a sintered body made of a sintered body of a nitride or a nitride as a main component. Herein, a nitride contains aluminum nitride and silicon nitride. Note that when a nitride is contained as a main component, from the viewpoint of a thermal conductivity, a content of the nitride is preferably 95 mass % or more and especially preferably 97% or more. Example components other than a nitride in this case can include: sintering assistant components such as an alkaline earth metal oxide and a rare earth metal oxide; and other ceramics components such as alumina.

A nitride sintered body of the invention may be made of any of a single crystalline material, a polycrystalline material, an amorphous material and a mixture of an amorphous material and a crystalline material, while preferable is a polycrystalline material in consideration of easy manufacture. No specific limitation is placed on a size and shape thereof and powder may be used and a preform obtained by forming in any shape such as a plate, a tube, a rod and other shapes may also be used.

A thermal conductivity and a reflectance of light in the wavelength region of from 350 nm to 800 nm and a density, all of a nitride sintered body of the invention can be measured by methods described below: That is, the thermal conductivity can be obtained by measurement with a laser flash method in a thermal constant measuring instrument. At this time, thickness correction may be achieved with a calibration curve. The reflectance of light in the wavelength region of from 350 nm to 800 nm can be measured with an integrating sphere method in a spectrophotometer. The density can be measured with the Archimedes' method and an automatic hydrometer and an electronic even balance. Diameters of the voids when confirmed whether or not voids are present in a sintered body and voids are present therein can be measured based on a scanning electron microscope (SEM) photograph of a section of a sintered body and a porosity can be obtained by measurement of a density and measurement with a porosimeter.

(1) A Method for Manufacturing a Nitride Sintered Body According to the First Embodiment A nitride sintered body according to the first embodiment of the invention can be obtained only with a manufacturing method of the invention in which aluminum nitride powder is burned in combination of use of a specific sintering assistant with operation in a specific sintering condition. A method for manufacturing a nitride sintered body according to the first embodiment will be explained below.

In a method for manufacturing an aluminum nitride sintered body according to the first embodiment, a preform is prepared by forming a composition containing 100 parts by mass of aluminum nitride powder and 0.5 to 10 parts by mass of an alkaline earth metal (preform preparation step). Any of aluminum nitride powder that has been conventionally used in order to obtain an aluminum nitride sintered body can be used without any specific limitation. However, from the viewpoint of a dense sintered body being obtainable, an average particle diameter of power to be used is preferably in the range of from 0.5 to 5 μm and especially preferably in the range of from 0.5 to 3 μm, and from the viewpoint of a sintered body with a high thermal conductivity being obtainable, an oxygen concentration in the powder to be used is preferably 1.0 mass % or less.

In a method for manufacturing a nitride sintered body according to the first embodiment, a compound containing an alkaline earth metal works as a sintering assistant. It is difficult to obtain a nitride sintered body according to the first embodiment when one of compounds other than such sintering assistants is used as a sintering assistant. Of compounds containing an alkaline earth metal, preferable is a compound containing calcium because of a high level of the effect. Specific examples of preferable compounds include: calcium oxide, calcium fluoride, calcium nitrate, calcium carbonate, calcium phosphate, $3CaO \cdot Al_2O_3$ and others. Among the compounds, the most preferable is $3CaO \cdot Al_2O_3$ since an obtained sintered body can be high in thermal conductivity and light reflectance. A content of a compound containing an alkaline earth metal is preferably in the range of from 1 to 7 in parts by mass relative to 100 parts by mass of aluminum nitride powder for a similar reason. Note that it is preferable to use a compound containing an alkaline earth metal in the form of fine powder with a purity of 99.9% or higher since a higher quality aluminum nitride sintered body is obtained.

When $3CaO \cdot Al_2O_3$ is used as a compound containing an alkaline earth metal, $3CaO \cdot Al_2O_3$ may be used as is or CaO and $Al_2O_3$ may be added in a molar ratio of 3:1 so as to form $3CaO \cdot Al_2O_3$ in a given amount during sintering. Note that it has been known that, generally, when a sintering assistant such as yttrium oxide is added into aluminum nitride, reactions occur among aluminum nitride, oxygen as an impurity thereof and yttrium oxide to form a composite compound having a melting point lower than a burning temperature, which, as a liquid phase, acts an influence on densification of a sintered body and improvement on characteristics of a sintered body (in this case, improvement on a thermal conductivity). It is confirmed that when a compound containing an alkaline earth metal such as $3CaO \cdot Al_2O_3$ is used as a sintering assistant as well, the compound does not stay in the initial form in a sintered body; phenomena occur that the compound is transformed into a composite oxide having a lower melting point or in some case, the compound reacts with carbon contained in an atmosphere during sintering with the result that the compound is vaporized away.

In the preform preparation step, a preform consisting of a composition containing 100 parts by mass of aluminum nitride powder and 0.5 to 10 parts by mass of a compound containing an alkaline earth metal is preferably obtained with: a method in which predetermined quantities of aluminum nitride powder and alkaline earth metal powder is dry mixed, which is formed with a uniaxial press method, a cold isostatic press (CIP) or the like; a method in which given quantities of aluminum nitride powder and alkaline earth metal powder, together with an organic solvent such as ethanol, are mixed by means of a wet mixing method or the like using a ball mill and the obtained mixture is dried to form powder and the powder is formed in a similar method to that as described above; or a method in which a green body containing given quantities of aluminum nitride powder and alkaline earth metal powder is formed into a given shape, followed by degreasing.

The green body can be obtained in a way similar to that when a common aluminum sintered body is manufactured, in which mixed with a wet mixing method using a ball mill or the like are aluminum nitride powder, compound powder including an alkaline earth metal, an organic solvent such as alcohols or toluene, an organic binder, a plasticizer such as glycerine to thereby prepare a slurry-like or a paste-like material, and the slurry-like or paste-like material is formed. Note that the green body may also be prepared by drying the slurry with a spray drying method as granules and forming the granules.

Note that any of known organic binders commonly used in preparation of a green body can be used, such as polyvinyl butylal, ethyl celluloses and acrylic resins, with no specific limitation, while preferably used are poly n-butyl methacrylate or polyvinyl butylal because of good formability of the green body. Note that a use quantity of an organic binder is preferably in the range of from 2 to 15 parts by mass relative to 100 parts by mass of aluminum nitride when a press preform is obtained and when a sheet is obtained, a use quantity of an organic binder is preferably in the range of from 5 to 15 parts by mass, which is the same as in the case of a press preform, relative to 100 parts by mass of aluminum nitride. Forming methods that can be adopted are a method for forming by casting a slurry; a method for forming a past-like green body into a sheet by means of a doctor blade method; a method for forming granules into a preform using a metal die press and the like.

Degreasing of a green body is conducted by heat treating a green body in an atmosphere of an oxidizing gas such as oxygen and air; an atmosphere of a reducing gas such as hydrogen; an atmosphere of an inert gas such as argon or nitrogen; an atmosphere of carbon dioxide; an atmosphere of a mixed gas thereof, or a humidified atmosphere of a gas or a mixed gas described above obtained by adding steam into an atmosphere. Degreasing has only to be conducted at a properly selected temperature in the range of 250° C. to 1200° C. for a properly selected holding time in the range of 1 min to 1000 min depending on a kind and quantity of an organic component contained in the green body. In the heat treatment, an atmosphere, a temperature and a holding time are adjusted to thereby reduce an oxygen quantity obtained by subtracting an oxygen in a sintering assistant from an oxygen quantity in all of the green body to be reduced preferably to 1.5 mass % or less, which facilitates a thermal conductivity of aluminum nitride sintered body in the invention to be raised 140 W/m·K or more. While a carbon component as a residue of an organic binder is contained in a preform after degreasing, a quantity (concentration) of the carbon component is preferably 5000 ppm or less and more preferably 3500 ppm. If a concentration of a carbon component exceeds 5000 ppm, densification of an aluminum sintered body is greatly suppressed, resulting in difficulty obtaining a sintered body high in thermal conductivity.

In a method for manufacturing a nitride sintered body according to the first embodiment, a preform prepared with a method as described above is sintered in the specific weak reducing atmosphere. When a compound not containing a rare earth metal such as yttria is used as a sintering assistant, sinterability decreases if a sintering atmosphere is reductive (containing carbon) with the result that a good sintered body is hard to be obtained. Contrary thereto, when an alkaline earth metal based sintering assistant such as calcium oxide is used in order to obtain an aluminum nitride sintered body having a high thermal conductivity of the order of 230 W/m·K, a necessity arises for sintering a preform while the sintering assistant is annihilated by vaporization or the like in a comparative strong reducing atmosphere (for example, see JP-A 2003-114631). The method for manufacturing a nitride sintered body according to the first embodiment has been completed by having found that when a method for manufacturing an aluminum nitride sintered body according to the first embodiment is operated in the latter system with a reducibility of the atmosphere controlled lower than usual, the sintering assistant is not completely annihilated by vaporization or the like; therefore, a thermal conductivity, though being not raised up to as high as 230 W/m·K, is kept at a sufficiently practical level thereof, in addition, a sinterability is not inferior to usual in an aspect of a mechanical property as well (this good level of sinterability is supported partly because of a sufficient high density) and a sintered body showing an excellent light reflectance not comparable with a conventional aluminum sintered body is obtained. A nitride sintered body according to the first embodiment is confirmed to give a high reflectance under an influence of a sintering assistant slightly remained in an aluminum nitride sintered body or a compound originating therefrom.

Note that a specific weak reducing atmosphere defined as "an atmosphere in a vessel which has a dismountable cover, at least the inner wall of which is made of boron nitride, which has a means for keeping a pressure inside the vessel in a state where the cover is closed substantially equal to a pressure outside the vessel, inside which a carbon plate having a surface area in the range of from 0.024 to 24 $mm^2$ per a volume of 1 $cm^3$ of the vessel is housed and an atmosphere inside which is replaced with an inert gas and/or hydrogen gas, the vessel with the cover closed and, the vessel and the carbon plate in the vessel being heated at a temperature in the range of from 1650° C. to 1950° C. and preferably in the range of from 1700 to 1900° C. using the same atmosphere outside the vessel as that inside the vessel as the inert gas and/or hydrogen atmosphere (which is in a state where a carbon plate itself remains even if carbon in the carbon plate is vaporized away)", and means an inert gas and/or hydrogen gas containing a specific small quantity of carbon vapor. The current analytical technique is substantially impossible to measure a concentration of a carbon gas contained in the gas at a high temperature in the range of from 1650° C. to 1950° C. Therefore, in a manufacturing method of the embodiment, an atmosphere is specified according to a specific method for controlling a specific weak reducing atmosphere described later. Note that as "a means for keeping a pressure inside the vessel in a state where the cover is closed substantially equal to a pressure outside the vessel" can be a means of fine communication holes or a means that a cover opens slightly when a pressure in the system is in a pressurized state and the cover is closed when a pressure in the system is almost equal to the outside pressure.

Since sintering of aluminum nitride requires a high temperature, a carbon furnace is sometimes used. When a carbon furnace is employed, control of a sintering atmosphere is difficult because of an influence of sublimation of carbon of a furnace material. In a manufacturing method of the embodiment, in order to eliminate the effect of this furnace material, a preform to be sintered is put in the special vessel as described above, that is in a vessel the inner surface of which is made of a heat resistant material such as boron nitride, and heated and sintered therein. When sintering is conducted in such a method, an atmosphere during sintering can be controlled to an appropriately reducing atmosphere by controlling a surface area of a carbon plate put in the vessel, thereby enabling a nitride sintered body (aluminum nitride sintered body) of the first embodiment to be achieved. Note that a heat resistant material means a material not melted, not decomposed or not sublimed at a sintering temperature and aluminum nitride or the like can be employed as the heat resistant material in addition to born nitride.

In a method for manufacturing a nitride sintered body according to the first embodiment, a method for sintering the preform such as a degreased material or the like can be conducted in a furnace and in conditions for raising temperature similar to those in a method with which a conventional aluminum nitride sintered body is obtained except that the atmosphere is controlled to a specific reducing atmosphere, wherein a burning temperature is preferably in the range of from 1650° C. to 1950° C. If the burning temperature is lower than 1650° C., a dense sintered body cannot be obtained and as a result a strength of a sintered body decreases. On the other hand, if the burning temperature is higher than 1950° C., a liquid phase generated from an impurity oxygen in aluminum nitride, a rare earth metal compound and others oozes out to the outside of a sintered body during sintering, which makes it difficult obtaining a dense sintered body. No specific limitation is placed on a sintering time but it is only required to hold a time in the range of from 1 hr to 10 hrs usually at a temperature of from 1800° C. to 1900° C. Note that it is preferable to determine conditions such as a burning temperature and a sintering time in a procedure in which a densification curve (a contraction curve) is investigated in advance for each of kinds of preform to be sintered in the temperature range to thereby determine conditions for enabling a sufficient densification level (at a density of 3.10 g/cm$^3$ or more and more preferably 3.15 g/cm$^3$ or more) to be acquired. Burning methods that can be adopted are an ordinary pressure burning (non-pressured burning), hot press burning, HIP burning (high temperature isostatic press burning) and the like, in which preferable is ordinary pressure burning because of easy control of an atmosphere.

In a method for manufacturing a nitride sintered body according to the first embodiment, a hermetically sealable vessel is employed in order to sinter a sintered body to be sintered in a specific weak reducing atmosphere, at least the inner surface of which is made of a heat resistant material, which has a means for keeping a pressure inside the vessel in a state where the cover is closed substantially equal to a pressure outside the vessel, inside which a carbon plate having a surface area in the range of from 0.024 to 24 mm$^2$ per a volume of 1 cm$^3$ of the vessel is housed so as not to be brought in contact with the preform and the vessel, and an atmosphere inside which is thereafter replaced with an inert gas and/or hydrogen gas, and the an atmosphere outside the vessel is thereafter replaced with an inert gas and/or hydrogen gas as aforementioned, the preform housed therein and the carbon plate have only to be heated to the sintered temperature. It is natural to be able to adopt any of other methods as far as it can control a burning atmosphere to a specific weak reducing atmosphere, and the method is preferably adopted since the method can control an atmosphere with ease even using a carbon furnace.

No specific limitation is placed on a vessel used in the method as far as the above conditions are met and, for example, any of vessels employed in the definition of the specific weak reducing atmosphere can be used. Note that the term "hermetically sealable" means that a vessel has hermetic sealability at a level at which an atmosphere inside the vessel can be held in a state different from an atmosphere outside the vessel, where movement of gases inside the vessel between outside the vessel is not absolutely cut off. At least the inner surface of a vessel is only required to be made of the heat resistant material such as boron nitride, aluminum nitride or the like, and for example, the inner surface of a carbon vessel lined with one of the heat resistant materials is also preferably used. Nitrogen, argon, helium and hydrogen can be used alone or as a mixed gas, as an inert gas and/or hydrogen gas, where preferably used is a nitrogen from the viewpoint of cost and handling. In order to prevent fusion between a vessel and a preform to be sintered in burning, so-called paving powder may be interposed therebetween. For example, boron nitride powder or the like can be used as paving powder.

A graphite plate or a graphite sheet can be preferably used as a carbon plate. No specific limitation is placed on a thickness of a graphite sheet and preferably used is a graphite sheet with a thickness in the range of from 0.1 to 5 mm. Note that a size of a carbon plate that is employed is preferably in the range of 0.05 to 10 mm$^2$ and especially preferably in the range of from 1.0 to 5.0 mm$^2$ in terms of its surface area, relative to a volume of a vessel of 1 cm$^3$ from the viewpoint of its effect.

(2) A Method for Manufacturing a Nitride Sintered Body According to the Second Embodiment A nitride sintered body according to the second embodiment of the invention can be obtained only by a procedure in which a nitride paste is coated on a base substrate having heat resistance, thereafter the base plate on which the nitride paste has been coated is burned under conditions that voids with a diameter of 0.1 μm or more remain in the sintered body after the burning in an atmosphere containing a reducing gas. Note that a nitride sintered body according to the second embodiment is formed in a layer on the base substrate having a heat resistance by the burning.

When a nitride paste is formed as is without being coated on a base plate and sintered to a so-called green body (or a green sheet), the green body can be three-dimensionally contracted during burning, therefore, nitride particles grow capturing nitride particles in the vicinity thereof thereinto to form a dense sintered body in which large particles are in close contact with one another. In contrast thereto, in the manufacturing method, since a nitride paste is burned in a state where the paste is as coated on a base substrate, contraction in a horizontal direction is restricted and sufficient growth of particles cannot be achieved, thereby producing voids at grain boundaries. Hence, it is confirmed that a nitride sintered body obtained in the method causes light irregular reflection thereon with ease to show a high light reflectance. It is thought that it is possible not to depend on the kind of the nitride included in the paste and to make it to white if the gap can be introduced into the grain boundaries from the principle of such making to white.

A method for manufacturing a nitride sintered body according to the second embodiment will be explained in detail below.

A substrate made of known ceramics can be used without specific limitation as a base substrate having a heat resistance used in a method for manufacturing a nitride sintered body according to the second embodiment. Ceramics that are structural materials of ceramic substrates include: for example, (i) oxide based ceramics such as aluminum oxide based ceramics, silicon oxide based ceramics, calcium oxide based ceramics and magnesium oxide based ceramics, (ii) nitride based ceramics such as aluminum nitride ceramics, silicon nitride based ceramics, and boron nitride ceramics, and (iii) beryllium oxide, silicon carbide, mullite, boro-silicate glass. Among them, preferable is a substrate consisting of a nitride of the same kind as contained in a nitride paste.

A substrate made of a ceramics sintered body is preferably used as a base substrate having a heat resistance used in a method for manufacturing a nitride sintered body according to the second embodiment because of easy availability with a desired shape. Note that such a ceramics sintered body substrate can be obtained by burning a green sheet made from ceramics raw powder having an average particle diameter in the range of from 0.1 to 15 $\mu$m and preferably in the range of from 0.5 to 5 $\mu$m.

The green sheet may contain a sintering assistant, an organic binder and the like. No specific limitation is placed on a sintering assistant and any of sintering assistants commonly used can be used according to a kind of ceramics raw powder. Furthermore, organic binders that are used include: polyvinyl butylal; ethyl celluloses; and acrylic resins, among which especially preferably used are poly n-butyl methacrylate and polyvinyl butylal because of good formability of a green sheet.

From the viewpoint of the thermal conductivity of an obtained sintered body, preferably used is a nitride ceramics green sheet obtained by forming nitride ceramics powder containing a sintering assistant as ceramics raw powder, and especially preferably used is a nitride green sheet obtained with nitride powder containing a sintering assistant (for example, yttrium oxide and calcium oxide when a nitride is aluminum nitride).

No specific limitation is placed on the shape of a base substrate having a heat resistance used in the invention (the base substrate having a heat resistance used in the invention is, hereinafter, also referred as simply to a base substrate) as far as the shape thereof has a surface on which a nitride paste can be coated thereon, and examples that can used include: a plate-like base substrate, a plate-like base substrate in part of which cutting or boring is applied, and a substrate with a curved surface. However, a plate-like base substrate is generally used.

No specific limitation is imposed on the thickness of a base plate, and the thickness thereof is preferably in the range of from 0.1 to 2 mm and especially preferably in the range of from 0.2 to 1 mm because of easy stock removal while a base plate is cut or ground to remove a stock after burning. A thicker base substrate is preferable since a good quality sintered body of the invention can be obtained even when a paste is coated to a thicker layer (if a thin substrate with a thick paste coat thereon is burned, a case arises where contraction in a direction along and in the surface cannot be sufficiently achieved, which is, in some case, resulted in non-uniformity or peeling-off of a sintered body).

A step of coating a paste in a method for manufacturing a nitride sintered body of the embodiment is implemented with a procedure in which a nitride paste is coated on a base substrate and a wet coat is dried if necessary to thereby produce a nitride paste layer on the base substrate. The nitride paste that is used can be a known ceramic paste consisting of components such as a nitride powder, a sintering assistant, an organic binder, an organic solvent, a dispersant, a plasticizer and the like without a specific limitation.

As other nitride powder used as a raw material of a nitride paste, an aluminum nitride powder or silicon nitride powder are preferably used from the view point of easily obtaining a nitride sintered body having a thermal conductivity of 50 (W/m·K) or more.

Nitride powder used as a raw material of a nitride paste preferably has an average diameter in the range of from 0.5 to 20 $\mu$m (more preferably in the range of from 1 to 15 $\mu$m) because of easy availability and a sintered body high in light reflectance being obtainable.

Sintering assistants contained in a nitride paste that can be used include oxides that are commonly used as a sintering assistant according to a kind of a nitride actually used. Examples thereof, when a nitride is aluminum nitride, that can be used include rare earth metal oxides such as yttrium oxide; and alkaline earth metal oxides such as calcium oxide.

Known organic binders can be used without a specific limitation as an organic binder contained in a nitride paste. Examples thereof that can be used include: acrylic resins such as polyacrylate and polymethacrylate; cellulose based resins such as methyl cellulose, hydroxymethyl cellulose, nitrocellulose and cellulose acetate butylate; vinyl group containing resins such as polyvinyl butylal, polyvinyl alcohol and polyvinyl chloride; hydrocarbon resins such as polyolefin; oxygen containing resins such as polyethylene oxide; and a mixture of two or more kinds thereof. Among them, preferable are acrylic based resins and cellulose based resin because of being dissolved into a solvent with ease.

Known organic solvents can be used without specific limitation as an organic solvent contained in a nitride paste. Examples thereof that can be used includes toluene, ethyl acetate, toluene, ethyl acetate, terpineol, butyl carbitol acetate, texanol and others.

Known dispersants can be used without specific limitation as a dispersant contained in a nitride paste. Example thereof that can be used includes: phosphoric acid ester based dispersants, polycarboxylate based dispersants and others.

Known plasticizers can be used without specific limitation as a plasticizer contained in a nitride paste. Example thereof that can be used includes: dioctylphthalate, dibutyl phthalate, diisononyl phthalate, diisodecyl phthalate, dioctyl adipate and others.

No specific limitation is placed on mixing ratios of raw material components in a nitride paste and the mixing ratios are preferably such that 0.1 to 15 parts by mass of a sintering assistant, 6 to 20 parts by mass of an organic binder, and 10 to 60 parts by mass of at least one kind selected from the group consisting of an organic solvent, a plasticizer and a dispersant, all relative to 100 parts by mass of nitride powder. The mixing ratios are especially preferably such that 1 to 10 parts by mass of a sintering assistant, 6 to 15 parts by mass of an organic binder, and 15 to 50 parts by mass of at least one kind selected from the group consisting of an organic solvent, a plasticizer and a dispersant, all relative to 100 parts by mass of aluminum nitride powder.

No specific limitation is placed on a method for preparing a nitride paste and any of methods can be adopted as far as various kinds of components are mixed together and a paste with uniform mixing ratios can be obtained, and known mixing methods can be adopted, such as, for example, a three-roll mill and a planetary mixer.

A method for manufacturing a nitride sintered body of the embodiment includes the step of coating a nitride paste prepared in such a way at given sites on a surface of a base substrate. No specific limitation is placed on a shape and size of a nitride paste coat. Such coating of a nitride paste can be conducted, for example, by means of one of known methods such as a screen process printing, calendering printing and pad printing.

The thickness of a formed nitride layer is preferably in the range of from 30 μm to 2 mm and especially preferably in the range of 50 μm to 1 mm when a thickness of the base substrate is in the range of from 0.1 to 2 mm and preferably in the range of 0.2 to 1 mm, respectively. If a paste layer is excessively thin, no desired light reflectance can be obtained and to the contrary, if a nitride paste layer is excessively thick, the layer is peeled off or causes non-uniform contraction therein, thereby disabling a good nitride sintered body to be obtained. Note that when a thick base plate is used, the thickness of a coat with a paste can be thicker.

A method for manufacturing an aluminum nitride sintered body of the embodiment preferably includes the step of drying an aluminum nitride paste layer formed on a base substrate before burning. Drying is preferably conducted by keeping the substrate in air at a temperature of the order of a value in the range of 40 to 150° C. for a time of the order of a value in the range of 1 to 30 min.

A ceramics substrate having a nitride paste layer prepared in a way as described above (hereinafter referred to as a ceramics substrate precursor) is burned to thereby obtain a nitride sintered body, which is a manufactured product in the invention, on the ceramic substrate in a layer. Note that, degreasing may be conducted on the precursor if necessary before the burning without causing a problem.

Degreasing can be conducted by heat treating a ceramics substrate precursor in an atmosphere of oxidizing gas such as oxygen or air, of a reducing gas such as hydrogen, of an inert gas such as argon or nitrogen, of carbon dioxide, of a mixed gas thereof, or of a humidified gas obtained by mixing steam thereinto. Conditions for a heat treatment have only to be properly selected as to a temperature in the range of from 250° C. to 1200° C. and as to a time in the range of 1 min to 1000 min according to a kind or amount of the organic component contained in the ceramics substrate precursor.

Burning directly subsequent to the degreasing treatment is necessary to be conducted in conditions that voids with a diameter of 0.1 μm or more remain in an obtained sintered body. In order to remain voids (air holes) in a sintered body, it is only required that not only is burning conducted in an atmosphere containing a reducing gas, but a burning temperature is also lower than a burning temperature in burning conducted to obtain a dense sintered body. In a method for manufacturing a nitride sintered body in such a state, contraction in two-dimensional directions is limited; therefore, voids remains even if burning is conducted even at a temperature at which voids (air holes) are annihilated in burning a green body. For example, in order to obtain a sintered body of the invention in a second embodiment in which a nitride is aluminum nitride, it is only required that a burning temperature is usually in the range of from 1600 to 1780° C., preferably in the range of from 1650 to 1780° C. and more preferably in the range of from 1700 to 1750° C. No specific limitation is placed on a burning time and the burning is preferably conducted for a time in the range of from 1 hr to 20 hrs and preferably in the range of from 2 to 10 hrs. If the temperature is lower than 1600° C., sintering of aluminum nitride particles are insufficient, resulting in a sintered body low in strength. On the other hand, if burning is conducted at a temperature exceeding 1780° C., voids at grain boundaries disappears, thereby disabling a high reflectance to be obtained.

The burning is necessary to be conducted in an atmosphere containing a reducing gas, preferably of an inert gas containing carbon vapor as a reducing gas. When burning is conducted in an atmosphere not containing a reducing gas, a case arises where a sintered body low in light reflectance is obtained. A concentration of a reducing gas in the atmosphere, though changing according to a kind of a sintering assistant contained in an aluminum nitride paste, is preferably of the specific weak reducing atmosphere in the case where a sintering assistant is a compound containing an alkaline earth metal. When a sintering assistant is a rare earth metal oxide such as yttrium oxide, an atmosphere is preferably a specific weak reducing atmosphere or an atmosphere having a carbon concentration lower than the former atmosphere. When a rare earth metal oxide such as yttrium oxide is used as a sintering assistant, a case arises that voids at grain boundaries decrease if burning is conducted in an atmosphere absolutely without a reducing gas and a light reflectance is lowered, though depending on a burning temperature.

By conducting sintering in such conditions, a substrate having "a layer of a nitride sintered body thereon" is prepared. The "a layer of a nitride sintered body thereon" cannot sufficiently grow particles therein, as described above, due to restriction on contraction in a direction along and in a surface of a base substrate during burning; therefore, an average diameter of aluminum nitride particles from which the layer is made decreases to a value in the range of from 10 to 80% and especially to a value in the range of from 20 to 75% as compared with nitride particles constituting a sintered body obtained by sintering a green body using the same raw powder.

An average diameter D (μm) of ceramics (aluminum nitride) particles constituting a densely sintered body generally can be obtained by means of the code method in the following way: That is, at first, a picture is taken of a section of a ceramics sintered body with scanning electron microscope. A magnification at this time is determined in a way such that a straight line having any particular length L (mm), which is usually the same as the width of a photograph, is drawn on the photograph in a direction perpendicular to the thickness direction of the ceramics sintered body (a direction in parallel to the main surface of the ceramics sintered body if the sintered body has a plate-like shape) and the number of intersections between the straight line and grain boundaries of the ceramics particles is in the range of from 10 to 50 counts, wherein a magnification is usually ×1000 to ×5000. A length U (mm) on the photograph corresponding to actual length 1 (μm) is obtained based on a magnification. Then, n straight lines are drawn in parallel with the straight line used in determination of the magnification in a given spacing (usually in the range of from 3 to 7 mm and especially 5 mm) on the photograph. The number n of straight lines at this time is adjusted so that a total number ε of intersections between grain boundaries of ceramics particles and all the straight lines is 100 to 300. N straight lines are drawn and intersections between the straight lines and grain boundaries are marked and a total number ε of the marks is counted. Then, D can be obtained based on the following equation.

$$D=(1.57 \times L \times n)/(U \times \epsilon)$$

In an aluminum nitride sintered body according to the second embodiment, however, the aluminum nitride particles are not densely sintered, and there are voids at grain boundaries. Since the presence of voids are not a premise in the code method, application of the code method is not proper in measurement of an average diameter of such a sintered body. Therefore, an average particle diameter and a diameter of a void of a sintered body having voids at grain boundaries in an aluminum nitride sintered body according to the second embodiment are determined based on an SEM photograph of a section of the sintered body in the following way. That is, for an average particle diameter, an arbitrary region is specified on one SEM photograph of sintered body taken arbitrarily to measure particle diameters of arbitrarily selected 100 particles that are recognizable as particles with certainty in the view field and to obtain an average diameter of the 100 particles. Then, similar operations are conducted on 9 SEM photographs taken in different view fields on the same sample to obtain an average particle diameter of sintered body from average particle diameters of the 10 SEM photographs. For avoid, the diameter of a void recognized in a view field has only to be measured. Note that "the diameter" used here means the maximum diameter. A porosity can be obtained from comparison between a theoretical density and a density measured on a nitride sintered body in the second embodiment (that is, for a nitride sintered body obtained in the method, only on a portion of "a layer of the nitride sintered body" excluding a portion of a base substrate). When many of voids present form holes communicated to each other, a porosity can also be determined by measurement with a porosimeter. A porosity can also be obtained from an area occupied by a sintered body and an area occupied by voids on an SEM photograph of a section, though this method lacks quantitative approach.

Note that, in the above description, description has been given of a method for forming one layer made from a nitride sintered body on a base substrate by burning a coat of a nitride paste formed on the base substrate having a heat resistance, while the invention, in addition thereto, includes a method for forming a layer of a nitride layer having a larger thickness by repeating the coating and burning step to sequentially stack layers of a nitride sintered body.

Since nitride sintered bodies according to the first embodiment and the second embodiment obtained by means of the methods have a high thermal conductivity and a high light reflectance, the sintered bodies can be preferably used as a material of a submount on which an LED is mounted. A submount for mounting LED thereon has a placing surface for placing the LED usually having electrodes thereon, electrodes connected electrically to the electrodes of LED are produced on the placing surface, and besides, a wiring pattern and via holes for connecting the electrodes electrically to an external power supply are formed on a surface and the interior of a surmount. When a nitride sintered body of the invention is used as a submount for LED, it is only required to form a pattern made of a metal layer serving as electrodes and metal wires on a ceramics substrate having a layer of a nitride sintered body on at least one surface side, or on a plate-like sintered body (substrate) made of a nitride sintered body. Methods for forming the pattern that can be adopted is any of conventional pattern forming methods such as a method in which a high melting point metal such as tungsten is pattern printed on a substrate to thereafter, burn the printed pattern to complete the pattern and to apply plating of nickel, silver or gold thereon and a method in which a metal thin film pattern is formed by means of sputtering method on a substrate, without a specific limitation. Through holes and via holes are formed in a substrate in processes of the methods, thereby also enabling electrical connection between the upper and lower surfaces of the substrate to be realized. A submount for mounting LED thereon using a nitride sintered body of the invention (a submount of the invention) has particularly no aspect different from a conventional submount, for example a submount for a compound light emitting element disclosed in JP-A No. 2003-60243, with the exception that an aluminum nitride sintered body of the invention is used as a substrate material of the submount. Since a nitride sintered body of the invention, however, is used as a substrate material, the submount of the invention is characterized by that radiatability and light reflectance are both high.

EXAMPLES

The invention will be specifically explained referred to examples, it should be understood that the invention is not limited to the examples.

First Embodiment

Example 1

Mixed together were 100 parts by mass of an aluminum nitride powder having an average particle diameter of 1.5 μm, and an oxygen concentration of 0.8 wt % and 5 parts by mass of $3CaO.Al_2O_3$. Then, ethanol was added into the mixture, which was mixed using a ball mill and dried to obtain mixed powder, and the mixed powder was CIP formed to obtain a preform having a diameter of 40 mm and a thickness of 5 mm, followed by degreasing in an oxidizing atmosphere of air. The obtained preform (degreased preform) and a carbon plate with a surface area of 320 mm$^2$ (a standard carbon plate having a plan view of a square with a size of 40 mm, a thickness thereof was 3 mm and a weight of 18 g was cut into pieces each having a size (10 mm×10 mm×3 mm thick as samples) with a side ¼ times that of the standard carbon plate) were put into a carbon made vessel with a cover, the inner wall of which is made of boron nitride, and which has an inside volume of 84 cm$^3$, so that the obtained preform and the carbon plate were brought into no contact with each other. Note that when the inside space of the vessel is put into a pressurized state by heating, the cover was slightly moved up by the raised pressure to form a clearance between the vessel proper and the cover and a pressure in inside space of the vessel was kept almost equal to the external pressure. Thereafter, the vessel was transported into a carbon furnace to conduct ordinary pressure burning in a nitrogen atmosphere at 1860° C. for a holding time of 15 hrs to obtain a sintered body. In FIG. 1, there is shown a microscopic (SEM) photograph of a fractured surface of the obtained sintered body. No void was found in the sintered body as shown in FIG. 1. A thermal conductivity, a reflectance of light in the wavelength region of from 350 nm to 800 nm (also referred to simply as a light reflectance) and a density of the obtained sintered body were measured. In Table 1 and FIG. 2, there is shown results of the measurement. Note that a thermal conductivity of the sintered body was measured with a thermal constant measuring instrument PS-7 manufactured by Rigaku Corporation in a laser flash method. Thickness correction at this time was performed with a calibration curve. A reflectance of light in the wavelength region of from 350 nm to 800 nm was measured using a spectrophotometer manufactured by Hitach, Ltd. in an integrating sphere method. In Table 1, there is shown the minimum light reflectance in the wavelength range and a reflectance of light with a wavelength of 700 nm. A density was measured using an automatic hydrometer manufactured by Toyo Seiki Seisaku-sho, Ltd. and an electronic even balance based on an Archimedes' method.

diameter of 0.5 μm, 9 parts by mass of ethyl cellulose and 40 parts by mass of terpinol to thereby prepare an aluminum nitride paste having an adjusted viscosity of 3500 cP at 25° C. An aluminum nitride powder having an average diameter of 1.5 μm and yttrium oxide as a sintering assistant were added to the aluminum nitride paste and the resultant aluminum nitride paste was sintered to obtain an aluminum nitride sintered body substrate, the aluminum nitride paste was screen printed on a surface of a base substrate made of the aluminum nitride sintered body substrate to a thickness of 300 μm and the screen-printed base substrate was dried at 80° C. for 5 min. Thus obtained substrate was burned in a similar way to that in Example 1 with the exception that a burning temperature and a burning time were adjusted as shown in Table 2 and the burned substrate was ground to remove a part thereof to thereby obtain an aluminum nitride sintered body.

TABLE 1

| | Carbon plate divisional proportions | Carbon plate surface area mm$^2$ | Thermal conductivity W/m·K | Minimum light reflectance %(at 350~800 nm) | Light reflectance %(at 700 m) | Density g/cm$^3$ |
|---|---|---|---|---|---|---|
| Example 1 | 1/4 | 320 | 170 | 51 | 69 | 3.24 |
| Example 2 | 1/8 | 110 | 144 | 68 | 79 | 3.11 |
| Comparative Example 1 | — | 0 | 168 | 31 | 43 | 3.25 |
| Comparative Example 2 | 1 | 3680 | 110 | *1 | *1 | 3.01 |

*1: In Comparative Example 2, as a lack of color uniformity was observed, the measurement of a minimum light reflectance at the range of wavelength from 350 nm to 800 nm and a light reflectance at wavelength of 700 nm was not performed. Because of excessive concentration of carbon vapor in the atmosphere, an obstruction against the sintering might have caused, resulting in the lack of color uniformity and a reduction of the density.

Example 2 and Comparative Examples 1 and 2

A standard carbon plate was divided into pieces in a divisional proportion shown in Table 1 and the pieces were put into the vessel (Example 2 and Comparative Example 2) and in a case, no carbon plate was put into the vessel (Comparative Example 1), and the other parts of each process are conducted in a similar way to that in Example 1 to thereby obtain sintered bodies. In Table 1, there is shown physical properties of the obtained sintered bodies.

Comparative Example 3

Sintering was conducted in the same way as in Example 1, with the exception that a degreased preform was placed in a carbon muffle without putting the degreased preform in a vessel with a cover. As a result, a black sintered body was obtained.

Second Embodiment

Example 3 and Example 4

Figure 3:
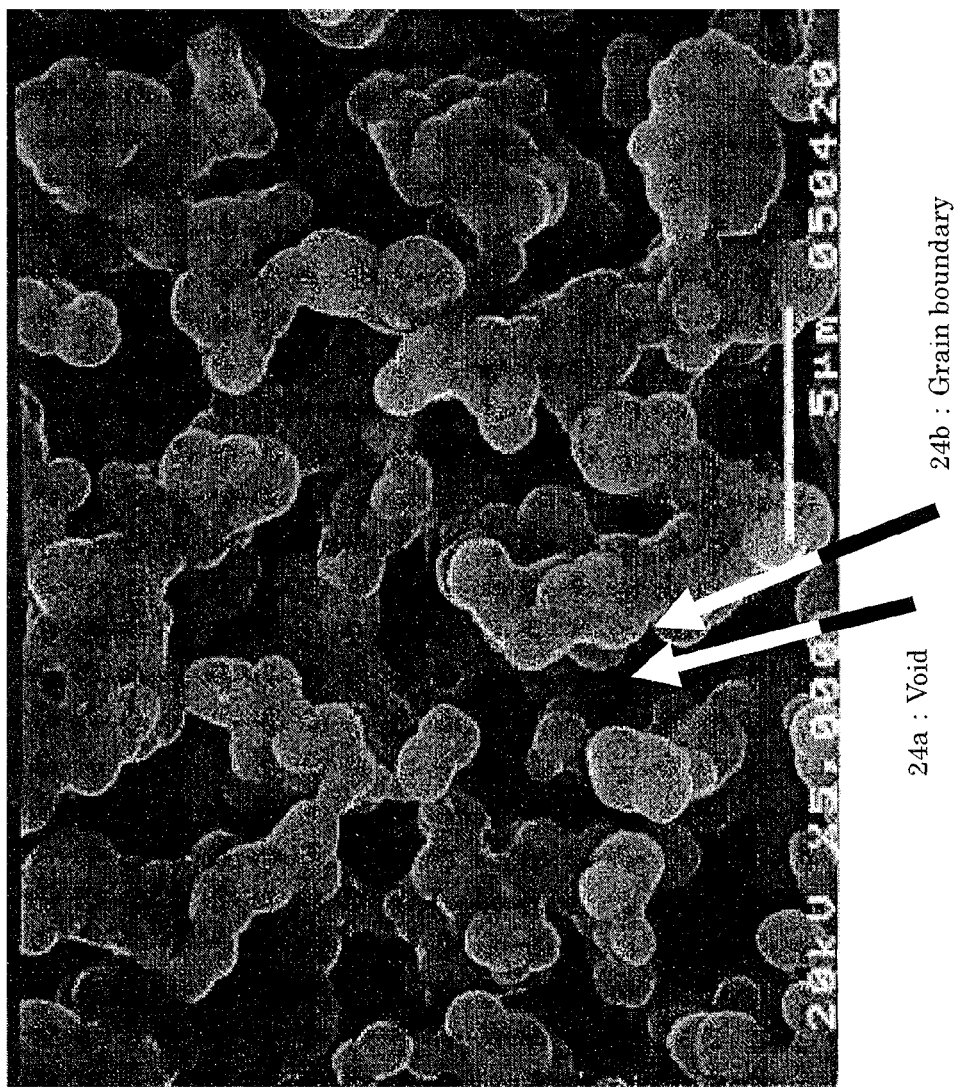
FIG. 3 is a scanning electron microscope (SEM) photograph showing a section of an aluminum nitride sintered body 24 (Example 3) according to the second embodiment which has voids 24a at grain boundaries 24b.
Figure 4:
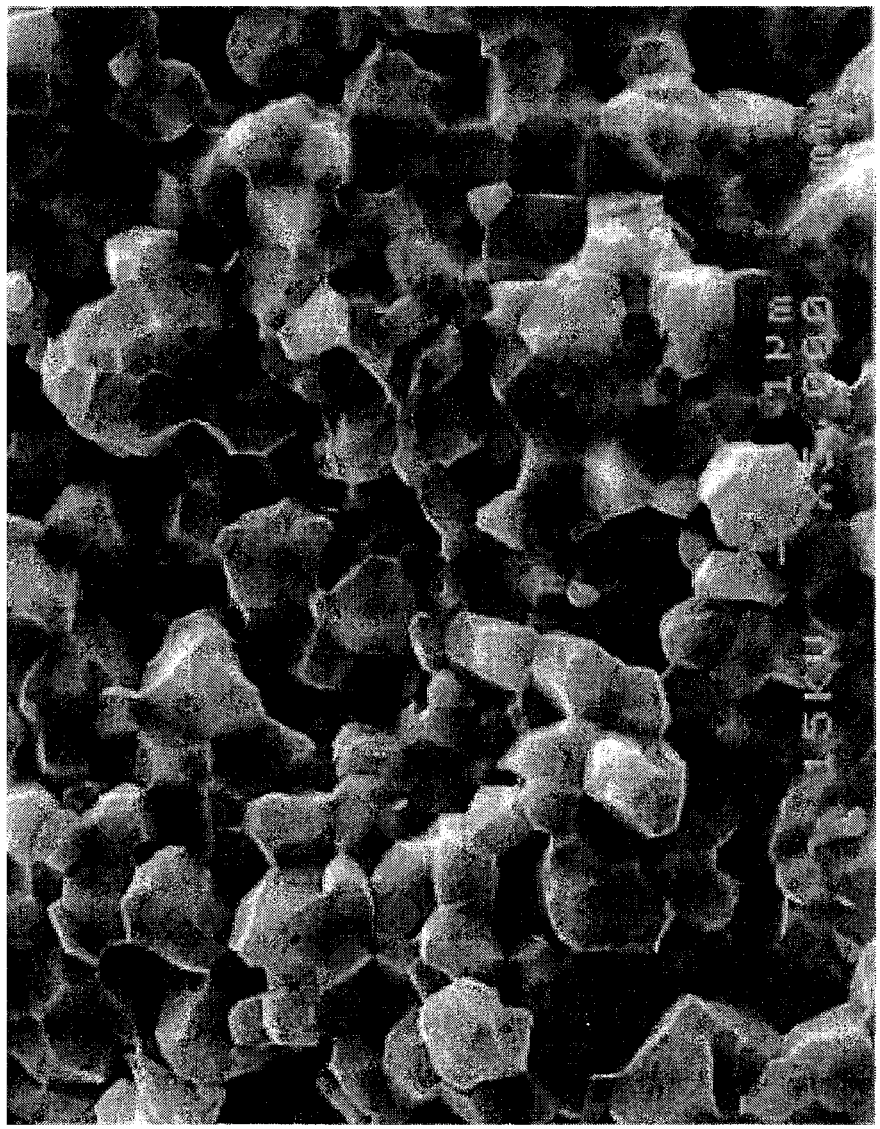
FIG. 4 is a scanning electron microscope (SEM) photograph showing a section of an aluminum nitride sintered body 24 (Example 4) according to the second embodiment.

Kneaded together were 100 parts by mass of an aluminum nitride powder (having an oxygen concentration of 0.8 mass %) having an average particle diameter of 1.5 μm, 5 parts by mass of yttrium oxide ($Y_2O_3$) powder having an average In FIGS. 3 and 4, there are shown microscopic (SEM) photographs of rupture surfaces of the sintered bodies obtained in Examples 3 and 4. It was confirmed as shown in FIG. 3 that there are voids with a diameter of 0.1 μm or more in the sintered body (In FIG. 3, there are observed more of voids with a diameter of 1 μm or more. In FIG. 4, there are observed voids with a diameter of 0.5 μm or more which are clearly distinguishable from a hole after removal of a particle, which are in a small number). Porosities were measured based on each of the SEM photographs, with the result that a porosity of Example 3 was about 50% and a porosity of Example 4 was about 10% (note that since contrast of a photograph is affected by conditions for picking-up and development, the porosity is only a reference value)

Measurement was conducted on a thermal conductivity of an obtained sintered body, a reflectance of light in the wavelength region of 350 nm to 800 nm (also referred to as a light reference) in similar ways to those in Example 1. Results are shown in Table 2 and FIG. 2 (only Example 3).

Comparative Example 4

A sintered body was obtained by the similar ways to those Example 3 without burning temperature. The temperature was set at 1850° C. for Comparative Example 4.

The physical properties obtained are shown in Table 2.

TABLE 2

|  | Burning temperature °C. | Burning time Hrs | Thermal conductivity W/m·K | Minimum light reflectance %(at 350~800 nm) | Light reflectance %(at 700 nm) | Porosity % |
|---|---|---|---|---|---|---|
| Example 3 | 1740 | 4 | 70 | 77 | 85 | About 50 |
| Example 4 | 1770 | 4 | 120 | 60 | 65 | About 10 |
| Comparative Example 4 | 1850 | 4 | 170 | 35 | 40 | 0 |

Comparative Example 5

Figure 2:
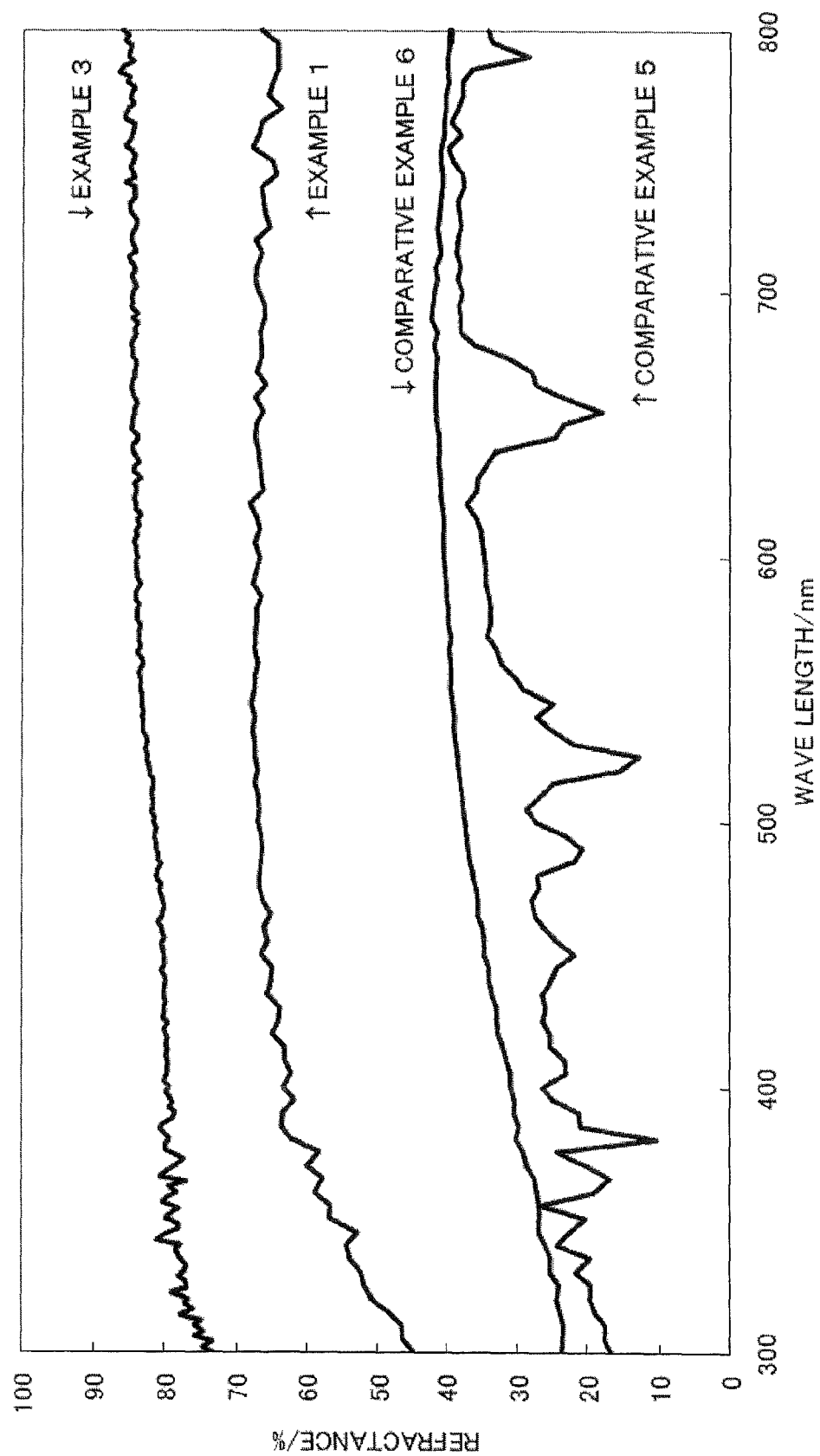
FIG. 2 is a graph showing a wavelength dependency of a light reflectance of an aluminum nitride sintered body according to the first embodiment (Example 1), an aluminum nitride sintered body according to a second embodiment (Example 3) and Comparative Examples 5 and 6.

A green sheet was prepared using raw powder obtained by adding erbium oxide ($Er_2O_3$) powder as a sintering assistant to 100 parts by mass of aluminum nitride powder (with an oxygen concentration of 0.8 mass %) having an average diameter of 1.5 μm, the obtained green sheet was degreased and thereafter, the degreased green sheet was burned to obtain an aluminum nitride sintered body. Note that burning is conducted in a way such that the degreased preform (the degreased green sheet) was inserted into the vessel used in Example 1, the atmosphere therein was replaced with nitrogen without putting a carbon plate into the vessel, the green sheet and the vessel were heated at a burning temperature of 1850° C. for 4 hours. The obtained sintered body was visually observed and had a light pink color. Measurement was conducted on the obtained sintered body about a light reflectance in a similar way to that in Example 1. A result is shown in FIG. 2. A light reflectance was 40% or less of anywhere in the wavelength region of 350 nm to 700 nm.

Comparative Example 6

Figure 5:
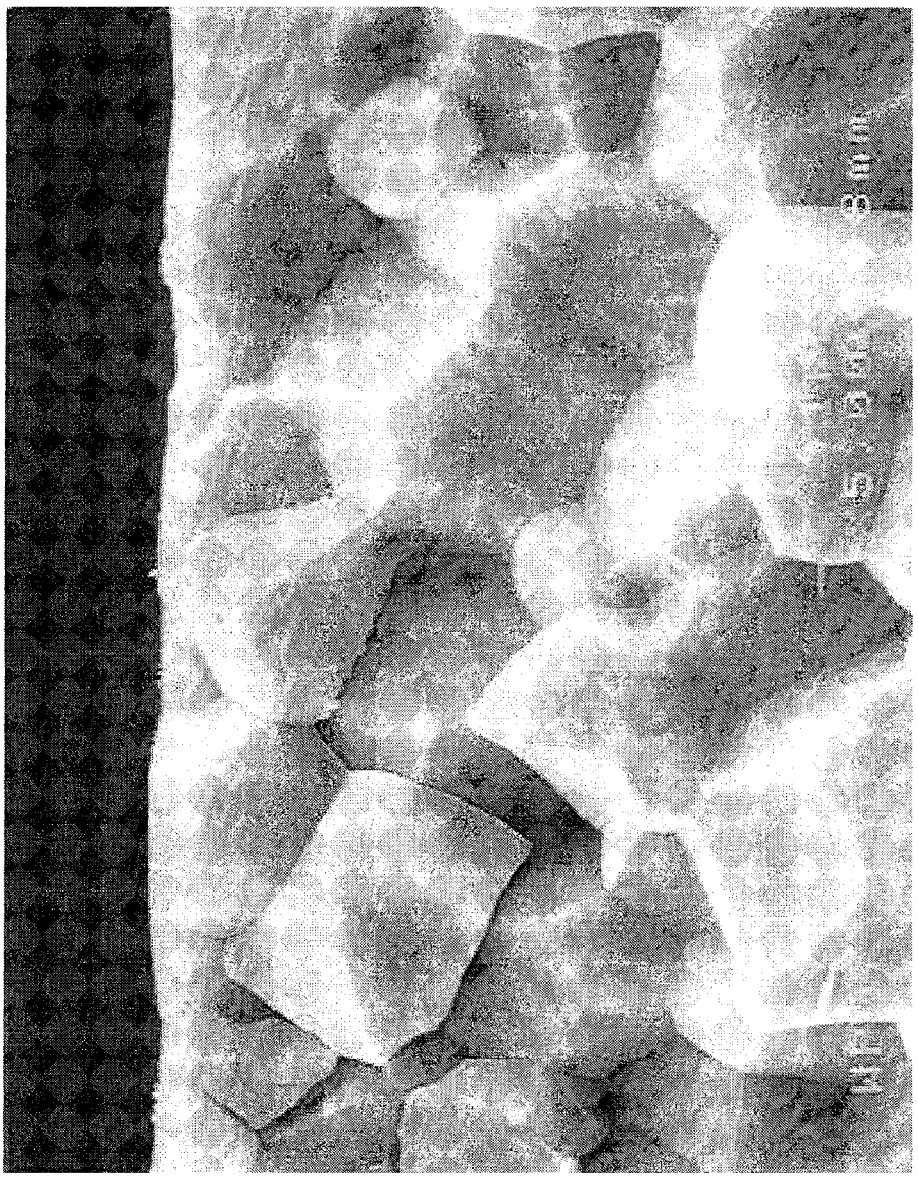
FIG. 5 is a scanning electron microscope (SEM) photograph of a section of an aluminum nitride obtained in Comparative Example 6.
Figure 6:
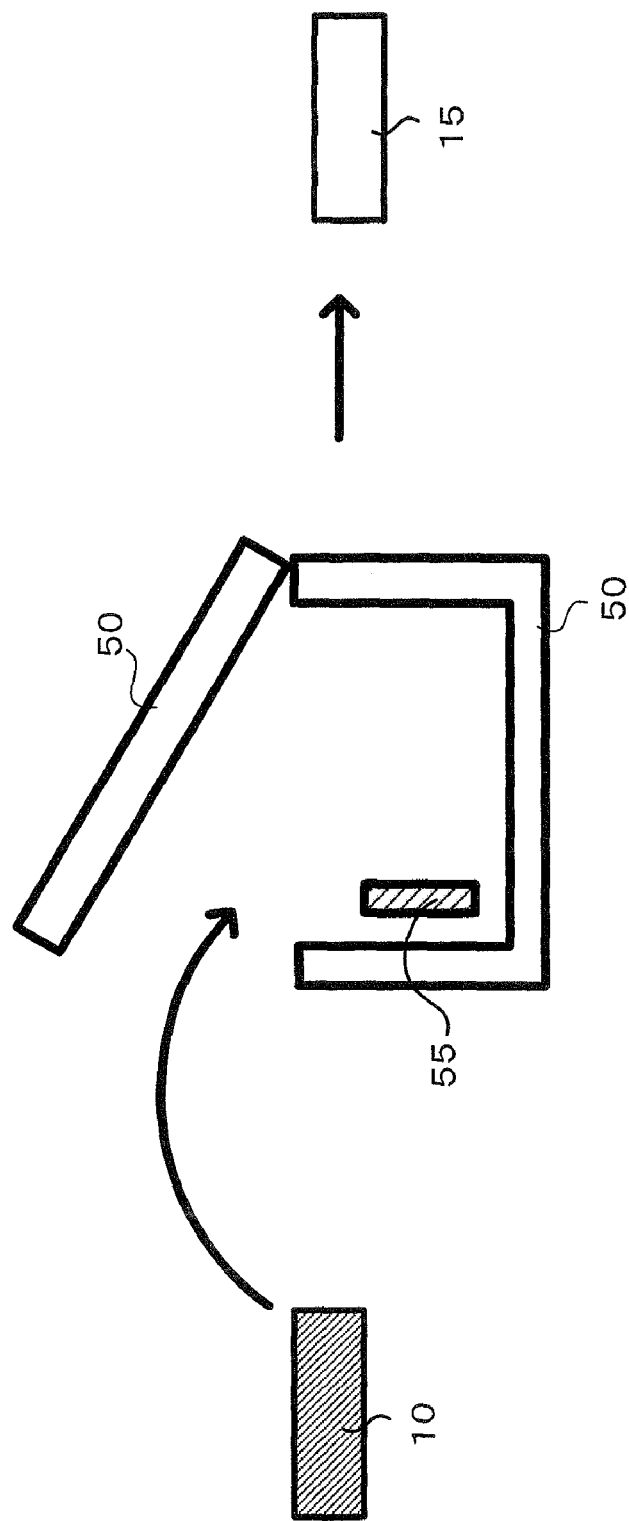
FIG. 6 is schematic figure showing a method for manufacturing an aluminum nitride sintered body according to the first embodiment. In this figure, a preform 10 is sintered in a vessel with a dismountable cover 50 in which a carbon plate 55 is housed, to form an aluminum nitride sintered body 15.
Figure 7:
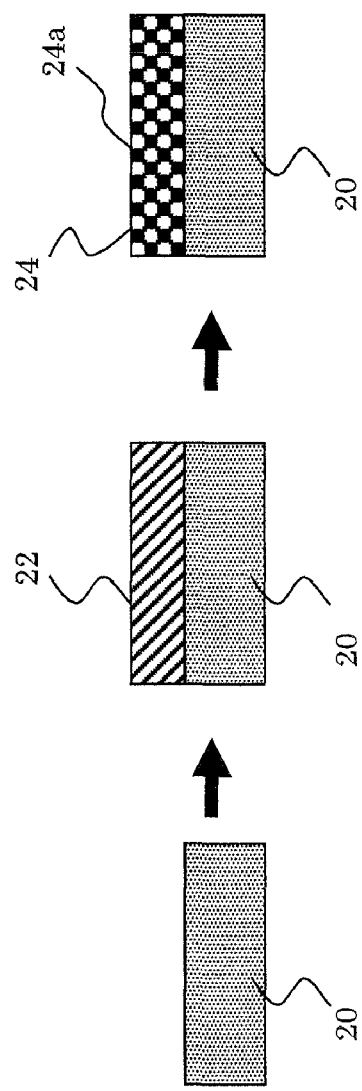
FIG. 7 is schematic figure showing a method for manufacturing a nitride sintered body according to the second embodiment. In this figure, a nitride paste 22 is coated on a base substrate 20, the resultant is burned to form a nitride sintered body 24.
Figure 8:
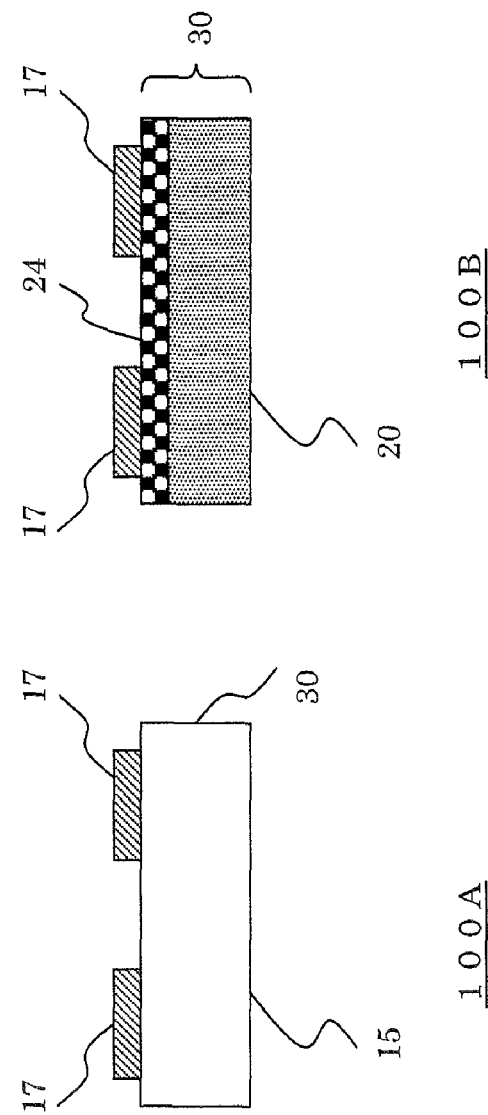
FIG. 8 is schematic figure showing submounts 100A and 100B including electrodes 17 and insulating substrate 30.
Figure 9:
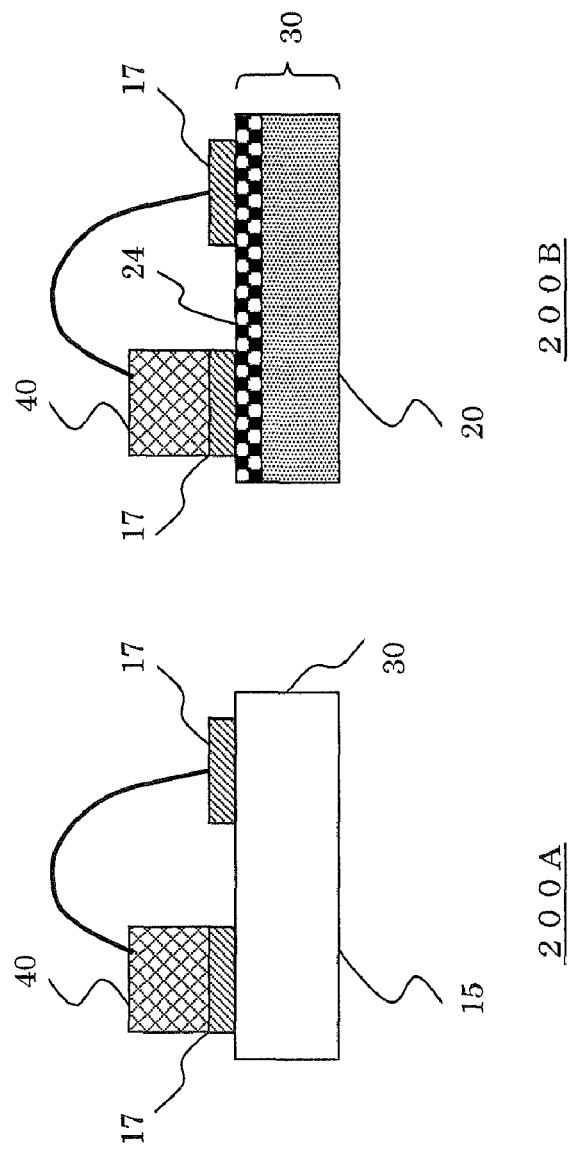
FIG. 9 is a schematic figure showing compound light emitting elements 200A and 200B including a light emitting element 40 and submounts 100A and 100B, respectively.

An aluminum nitride sintered body was prepared in a similar way to that in Comparative Example 5 with the exception that yttrium oxide ($Y_2O_3$) was employed as a sintering assistant instead of erbium oxide. The obtained sintered body was visually observed and had a gray color with slight transparency. A light reflectance was measured on the sintered body in a similar way to that in Example 1. A result is shown in FIG. 2. A light reflectance was 40% or less of light anywhere in the wavelength region of 350 nm to 700 nm. In FIG. 5, there is shown an SEM photograph of a rupture surface. It is found from FIG. 5 that no void remains in the sintered body.

The invention claimed is:

1. An aluminum nitride sintered body produced by sintering a preform which consists of a composition containing 100 parts by mass of aluminum nitride powder and 0.5 to 10 parts by mass of a sintering assistant consisting of a compound(s) containing an alkaline earth metal, wherein the aluminum nitride sintered body has a thermal conductivity of 140 (W/m×K) or more, a density of 3.10 g/cm3 or more, a minimum reflectance of light in the wavelength region of from 350 nm to 800 nm of 50% or more, and a reflectance of light with a wavelength of 700 nm of 60% or more.

2. A method for manufacturing an aluminum nitride sintered body according to claim 1, comprising the steps of:
preparing a preform by formmolding a composition containing 100 parts by mass of aluminum nitride powder and 0.5 to 10 parts by mass of a compound containing an alkaline earth metal; and
sintering the preform prepared in the previous step in a specific weak reducing atmosphere defined below, wherein the specific weak reducing atmosphere means an atmosphere in a vessel which has a dismountable cover, at least the inner wall of which is made of boron nitride, which has a means for keeping a pressure inside the vessel in a state where the cover is closed substantially equal to a pressure outside the vessel, inside which a carbon plate having a surface area in the range of from 0.024 to 24 mm2 per a volume of 1 cm3 of the vessel is housed and an atmosphere inside which is replaced with an inert gas and/or hydrogen gas, the vessel with the cover closed and, the vessel and the carbon plate in the vessel being heated at a temperature in the range of from 1650° C. to 1950° C. using the same atmosphere outside the vessel as that inside the vessel as the inert gas and/or hydrogen atmosphere.

3. The method for manufacturing an aluminum nitride sintered body according to claim 2, wherein, in the step of sintering the preform in a specific weak reducing atmosphere, a hermetically sealable vessel is employed, at least the inner surface of which is made of a heat resistant material, which has a means for keeping a pressure inside the vessel in a state where the cover is closed substantially equal to a pressure outside the vessel, inside which a carbon plate having a surface area in the range of from 0.024 to 24 mm2 per a volume of 1 cm3 of the vessel and the preform and the vessel are housed so that the carbon plate is not to be brought in contact with the preform and an atmosphere inside which is thereafter replaced with an inert gas and/or hydrogen gas, the vessel, and the preform and the carbon plate in the vessel being heated using the same atmosphere outside the vessel as that inside the vessel as the inert gas and/or hydrogen atmosphere.

4. A submount comprising:
an insulating substrate having a placing surface and electrodes,
wherein the insulating substrate is made from the aluminum nitride sintered body according to claim 1.

5. A compound light emitting element comprising:
a light emitting element, and
a submount according to claim 4.

6. A submount comprising:
an insulating substrate having a placing surface and electrodes,
wherein at least the surface on the placing surface side of the insulating substrate is made from the aluminum nitride sintered body according to claim 1.

7. A compound light emitting element comprising:
a light emitting element, and
a submount according to claim 6.

* * * * *